United States Patent [19]
Turnbull

[11] Patent Number: 5,821,733
[45] Date of Patent: Oct. 13, 1998

[54] MULTIPLE CELL AND SERIALLY CONNECTED RECHARGEABLE BATTERIES AND CHARGING SYSTEM

[75] Inventor: Robert R. Turnbull, Buchanan, Mich.

[73] Assignee: Packard Bell NEC, Sacramento, Calif.

[21] Appl. No.: 767,170

[22] Filed: Dec. 16, 1996

Related U.S. Application Data

[63] Continuation of Ser. No. 200,015, Feb. 22, 1994.

[51] Int. Cl.$^6$ .................................................. H01M 10/46
[52] U.S. Cl. ........................... 320/116; 320/118; 320/122
[58] Field of Search ................................... 320/2, 5, 6, 7, 320/15, 16, 17, 18, 110, 116, 118, 120, 121, 122

[56] References Cited

U.S. PATENT DOCUMENTS

| | | | |
|---|---|---|---|
| 4,238,721 | 12/1980 | DeLuca et al. | 320/18 |
| 4,303,877 | 12/1981 | Meinhold | 320/6 |
| 4,713,597 | 12/1987 | Altmejd | 320/6 X |
| 5,206,577 | 4/1993 | Fish | 320/2 |

Primary Examiner—Edward Tso
Attorney, Agent, or Firm—Fitch, Even, Tabin & Flannery

[57] ABSTRACT

A battery charging system for multiple series connected battery cells which includes a plurality of shunt regulators, adapted to be connected in parallel with each of the cells. The voltage of each cell is monitored during charging. When a cell is fully charged, excess charging current is shunted around the fully charged cell to enable the remaining cells to continue to charge. Circuitry is also provided to prevent the charging system from discharging the cells when the battery is not being charged. In an alternative battery charging system, a voltage source is connected across each of the serially connected batteries. Each voltage source is capable of sourcing or sending charging current. During charging conditions, the voltage sources source charging current to the cells. In order to prevent fully charged cells from being overcharged, the voltage across each cell is monitored. When the cell becomes fully charged, as indicated by the cell voltage, excess charging current is sunk to ground. In another embodiment of the invention, a rechargeable battery, formed from multiple internally series connected cells is provided with an integral battery charger within the battery housing.

6 Claims, 3 Drawing Sheets

MULTIPLE CELL AND SERIALLY CONNECTED RECHARGEABLE BATTERIES AND CHARGING SYSTEM

This is a continuation of application Ser. No. 08/200,015, filed Feb. 22, 1994.

BACKGROUND OF THE INVENTION

1. Field of the Invention

The present invention relates to a rechargeable battery and a battery charging system and, more particularly, to a rechargeable multiple cell battery and battery charging system for simultaneously charging batteries formed from multiple cells connected in series which eliminates the risk of overcharging any of the cells due to poor cell voltage matching.

2. Description of the Prior Art

Rechargeable batteries are known. More particularly, both rechargeable alkaline and nickel cadmium (NiCad) batteries are known. Rechargeable alkaline batteries provide many advantages over rechargeable NiCad batteries. For example, rechargeable alkaline batteries have been found to last up to three times longer per charge than fully charged NiCad batteries. In addition, alkaline batteries have relatively longer shelf lives than comparable NiCad batteries and are free of cadmium which requires special handling under the new environmental regulations.

Charging systems for rechargeable alkaline batteries are also known. However, such rechargeable alkaline battery charging systems have only been used on single cell batteries, such as standard AAA, AA, C and D sizes. However, there are various problems in attempting to charge a multiple cell batteries, such as a 9-volt battery; formed from a plurality of 1.5 volt cells connected in series. In particular, alkaline battery cells are known to have relatively poor cell voltage matching which, in turn, can result in one of the cells connected in series eventually being overcharged. Such overcharging can cause the cell to eventually leak. Thus, known rechargeable alkaline battery charging systems have been limited to single cell batteries. Even in charging systems for charging multiple single cell batteries, each of the single cell batteries is charged independently in such systems. Due to the poor cell voltage matching of multiple cell batteries, charging systems for rechargeable multiple cell alaline batteries, such as a 9V battery, are not available. Since many devices require 9-volt batteries, rechargeable NiCad batteries must be used in such applications. As mentioned above, such NiCad batteries put additional burdens on manufacturers because of the new environmental regulations and also have certain disadvantages relative to the alkaline batteries as discussed above.

SUMMARY OF THE INVENTION

It is an object of the present invention to provide a rechargeable multiple cell battery and battery charging system which solves various problems in the prior art.

It is yet another object of the present invention to provide a rechargeable battery formed from a plurality of battery cells internally connected in series which includes a plurality of output terminals to enable such multiple cell batteries to be relatively uniformly charged.

It is yet a further object of the present invention to provide a battery charging system for charging a plurality of battery cells connected in series which virtually eliminates the possibility of overcharging any of the series connected cells due to the relatively poor cell matching of the individual cells.

It is yet another object of the present invention to provide a multiple cell rechargeable battery with an integral battery charger.

Briefly, the present invention relates to a rechargeable multiple cell battery and a battery charging system for multiple series connected battery cells which includes a plurality of shunt regulators, adapted to be connected in parallel with each of the cells. The voltage of each cell is monitored during charging. When a cell is fully charged, excess charging current is shunted around the fully charged cell to enable the remaining cells to continue to charge. Circuitry is also provided to prevent the charging system from discharging the cells when the battery is not being charged. In an alternative battery charging system, a voltage source is connected across each of the serially connected batteries. Each voltage source is capable of sourcing or sinking charging current. During charging conditions, the voltage source sources charging current to the cells. In order to prevent fully charged cells from being overcharged, the voltage across each cell is monitored. When the cell becomes fully charged, as indicated by the cell voltage, excess charging current is sunk to ground. In another embodiment of the invention, a rechargeable battery, formed from multiple internally series connected cells, is provided with an integral battery charger within the battery housing.

DESCRIPTION OF THE DRAWINGS

These and other objects of the present invention will be readily apparent from the following description and attached drawings wherein.

DETAILED DESCRIPTION OF THE PREFERRED EMBODIMENT

The present invention relates to a multiple cell battery and battery charging system for a multiple cell battery which enables a battery formed from multiple series connected battery cells to be charged without overcharging of any of the individual cells due to poor cell voltage matching. Although the battery charging system, in accordance with the present invention, is primarily disclosed and illustrated relative to a 9-volt alkaline battery formed from six (6) 1.5 volt cells internally connected in series, the principles of the present invention are applicable to virtually any type of multiple cell batteries which have relatively poor cell voltage matching characteristics, such as lithium batteries. In addition, the principles of the present invention are also applicable to a battery charging system for charging a plurality of externally series connected cells, such as a plurality of AA batteries, to enable in-circuit charging without causing overcharging of any of the series connected cells.

Figure 1:
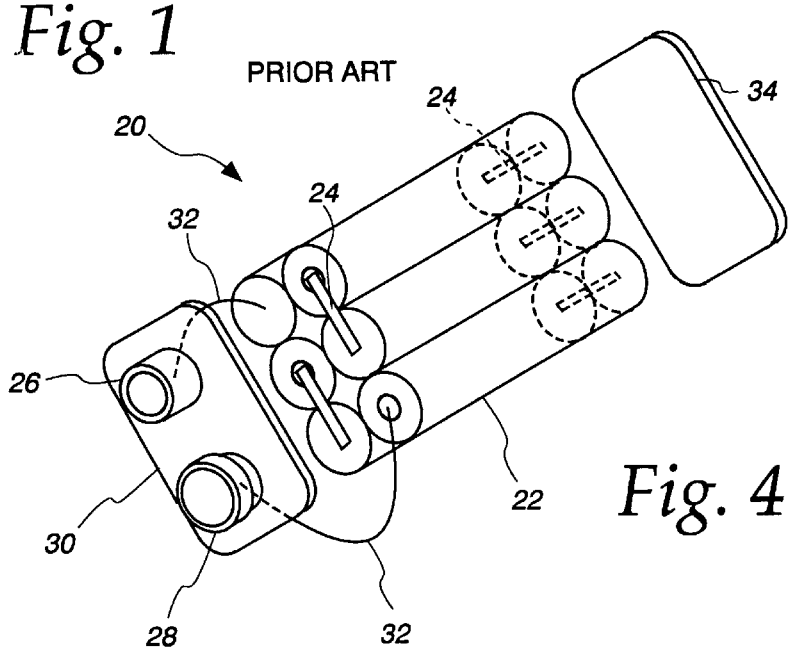
FIG. 1 is a perspective view of a known 9-volt battery which includes six (6) tubular shaped internally series connected 1.5 volt cells, shown with the outer casing removed.

Referring to FIG. 1, a conventional 9-volt alkaline battery is shown with its outer housing removed. The battery, generally identified with the reference numeral 20, is formed from six (6) 1.5 volt alkaline cells 22. These cells 22 are connected in series by way of a plurality of conductive straps 24. The positive and negative voltage terminals of the first and last cell 22, respectively, in the series chain are connected to external terminals 26 and 28, by way of electrical conductors 32 such that the voltage across the external terminals 26 and 28 is the sum of all of the cell voltages within the battery. A top end cap 30 and a bottom end cap 34 are used to close the top and bottom of an external housing (not shown); normally disposed around the cells 22. The external terminals 26 and 28 are rigidly secured to the top end cap 30.

Figure 2:
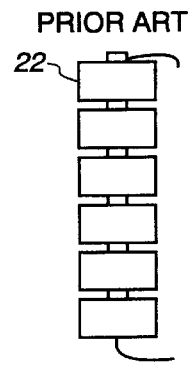
FIG. 2 is a simplified diagram of an alternate embodiment of a known 9-volt battery comprised of a plurality of disc shaped 1.5 volt cells.

FIG. 1 illustrates a known 9-volt battery formed from individual elongated tubular cells 22. FIG. 2 illustrates an alternative construction of a known 9-volt battery wherein each of the individual cells 24 are formed in a disc shape and stacked one on top of the other, thus obviating the need for the conductive straps 24. In this embodiment, the individual terminals of the cells 22 are directly connected to one another to form the series connection.

With both known types of 9-volt batteries illustrated in FIGS. 1 and 2, only two terminals are available on the outside of the housing to connect the battery into a circuit as well as for charging. As mentioned above, alkaline batteries are known to have inherently poor cell voltage matching characteristics. As such, directing a source of charging current through all of the series connected cells 22 can result in overcharging of one or more of cells 22 within the battery. More particularly, due to the poor cell matching characteristics of alkaline batteries, sourcing a charging current through a series connected batteries would result in the cells becoming fully charged at different rates. As such, certain cells would become fully charged before the other cells. By allowing the charging current to continue to flow through all of the series connected cells in such a situation, the cells which first became fully charged would eventually overcharge and possibly become damaged. Thus, known battery charger systems have not addressed the issue of charging series connected cells 22.

Figure 4:
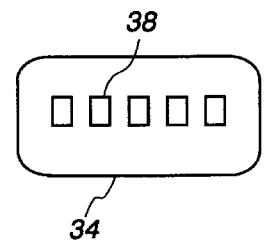
FIG. 4 is an end view of an alternative bottom end cap in accordance with the present invention.
Figure 3:
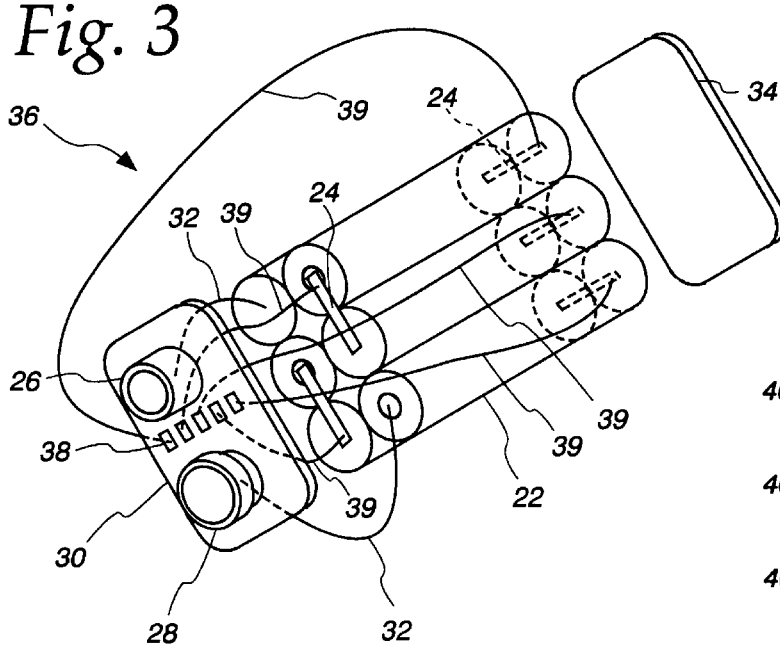
FIG. 3 is a perspective view of a multiple cell battery in accordance with the present invention.
Figure 5:
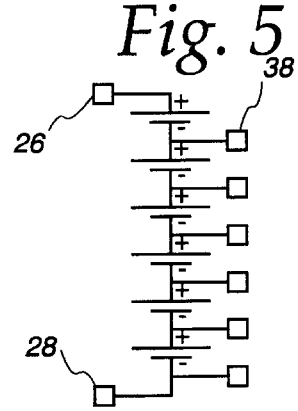
FIG. 5 is a schematic representation of the main and auxiliary terminals for the battery illustrated in FIG. 3.

FIG. 3 illustrates a multiple cell battery 36 in accordance with the present invention which enables the battery 36 to be charged while virtually eliminating the risk of overcharging individual cells 22 within the battery 36. In particular, the battery 36 is formed in a conventional manner with a plurality of cells 22 connected in series by way of conductive straps 24. The battery 36 further includes an outer housing (not shown) opened at both ends and closed by the end caps 30 and 34. The positive and negative terminals of the first and last cell 22, respectively, in the series chain are connected to the external terminals 26 and 28 as discussed above. However, in accordance with an important aspect of the present invention, the junction of the positive and negative terminals of each of the intermediate cells 22 are connected to auxiliary external terminals 38, illustrated schematically in FIG. 5, by way of electrical conductors 39. The auxiliary terminals 38 may be carried by the top end cap 30, as illustrated in FIG. 3, adjacent the main external terminals 26 and 28. Alternatively, the external auxiliary terminals 39 may be carried by the batteries end cap 34 as illustrated in FIG. 4 and, similarly, connected to the positive and negative terminals of the intermediate cells 22 by way of the electrical conductors 39. In such an embodiment, the plane of the auxiliary terminals 39 may be recessed from the plane of the bottom end cap 34 to reduce the risk of cell shorting when the cell is placed on a conductive surface.

Figure 6:
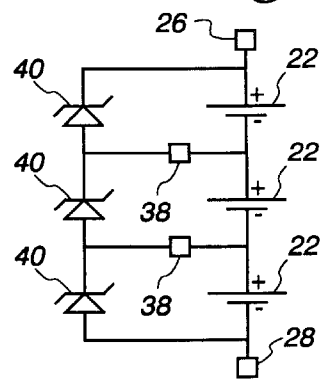
FIG. 6 is a simplified schematic diagram of the charging circuit in accordance with the present invention.
Figure 7:
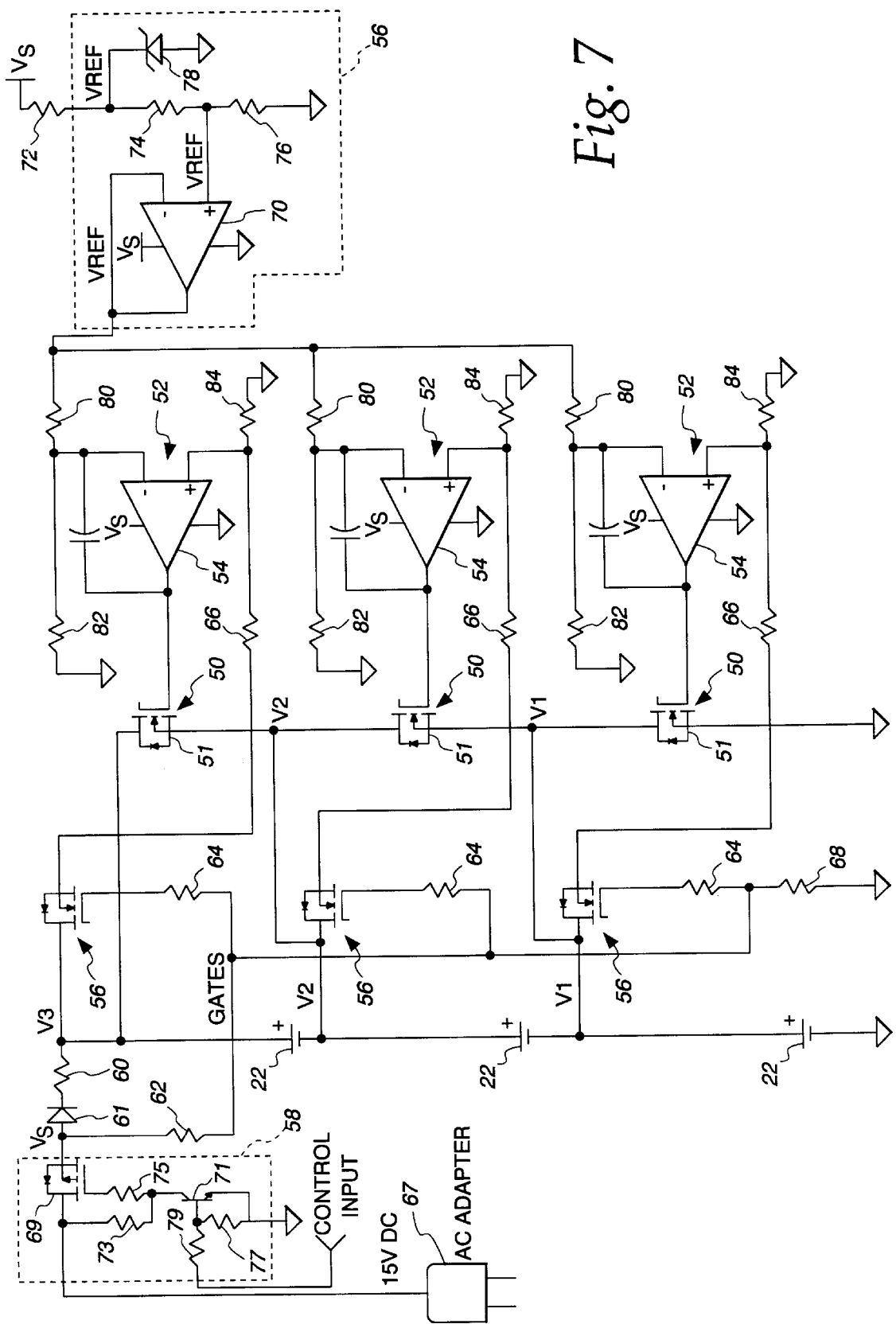
FIG. 7 is a detailed schematic diagram of a battery of charging circuit in accordance with the present invention.

The battery charging circuit, in accordance with the present invention, is illustrated in FIG. 7. FIG. 6 illustrates a simplified representation of the battery charging circuit in accordance with the present invention whereas FIG. 7 represents a detailed embodiment of the battery charging circuit in accordance with the present invention. For simplicity, the charging circuit has only been shown for charging three (3) cells 22. However, the principles of the present invention are clearly applicable to charging any number of series connected battery cells 22.

Referring to FIG. 6, three (3) individual battery cells 22 are connected in series between the main terminals 26 and 28. In this embodiment, since only three (3) cells are being charged, two (2) auxiliary terminals 38 are required. These auxiliary terminals 38, in conjunction with the main terminals 26 and 28, enable shunt regulators 40, shown as Zener diodes for simplicity, to be connected in parallel across each of the series connected cells 22. By connecting the shunt regulators 40 across each of the series connected cells 22, anytime one of the cells 22 becomes fully charged, the shunt regulator 40 shunts the charging current around that cell to prevent damage to that cell while the remaining cells are being charged.

Alkaline battery cells 22 are known to be fully charged when their terminal voltage is about 1.65 volts. Thus, the shunt regulator 40 must be selected to shunt the charging current around the cell 22 whenever the cell voltage exceeds about 1.65 volts DC. Unfortunately, Zener diodes with such low breakdown voltages are relatively inaccurate. As such, use of such Zener diodes in such an application can still result overcharging and possibly damage to one or more of the cells 22 within the battery.

The circuit disclosed in FIG. 7 solves this problem by providing a relatively more accurate control of the current shunting around the cell 22 when the cell is fully charged. Referring to FIG. 7, the battery charging circuit in accordance with the present invention is shown for simplicity for charging three (3) cells. The circuitry includes a plurality of shunt regulators 50 which enable the charging current to the three (3) cells shown 22 to be shunted around individual cells as they become fully charged. Each of the shunt regulators 50 includes a field effect transistor (FET 51 whose drain and source terminals are connected in parallel across each of the cells 22. Each shunt regulator 50 is under the control of a voltage sensing circuit 52 which includes a differential amplifier 54 which senses the actual cell voltage ($V_1$, $V_2$ or $V_3$) of the cell 22 and compares it with a reference voltage $V_{REF}$. The reference voltage $V_{REF}$ is developed by a circuit identified within the dash box with the reference numeral 56. The outputs of the differential amplifiers 54 are used to control the gates of the FETs 51. If the actual cell voltage ($V_1$, $V_2$ or $V_3$) measured at the cell 22 is greater than the reference voltage $V_{REF}$, the output of the differential amplifier 54 will be positive to switch the shunt regulator 50 on by turning the FET 51 on to enable the charging current to be shunted around that particular cell 22. Should the actual cell voltage ($V_1$, $V_2$ or $V_3$) be less than the reference voltage $V_{REF}$, the output of the differential amplifier 54 will be negative keeping the shunt regulators 50 off. During this condition, the charging current will flow through those cells 22 which have not been shunted.

In order to prevent the battery charging circuit from discharging the cells 22 when the battery charger circuit is not being used, a plurality of isolation switches 56, which may be FETs, are provided to disconnect the cells 22 from the battery charging circuit to prevent the battery charging circuit from discharging the cells 22 when the charger is not being utilized. In order to discharge the gate capacitance of the isolation switches 56, a resistor 68 is connected to the gate terminals of each of the isolation switches 56 by way of their respective scaling resistors 64.

The isolation switches 56 are configured to prevent the cells 22 from being discharged by way of the serially connected resistors 66 and 84 when the battery charger is not being used. In particular, the drain and source terminals of each of the isolation switches 56 is connected between the positive terminal of each cell and the resistor 66. The gate terminal of each of the isolation switches 76 is under the control of the input charging voltage supply $V_s$. More particularly, as shown, a charging voltage supply 58, which provides a charging voltage $V_s$, is used to develop a charging current $I_{charge}$ by way of a resistor 60 to charge each of the series connected cells 22. The gate terminal of each of the isolation switches 56 may be connected to the supply voltage $V_s$ by way of a plurality of resistors 62 and 64, which form a voltage divider to control the operation of the isolation switch 56. Thus, when the charging voltage $V_s$ is applied to the cells 22, a positive voltage is developed at the gate terminals of each of the isolation switches 56 to connect the positive terminals of each of the cells 22 to the scaling resistor 66. When the charging voltage $V_s$ is removed or unavailable for charging, the voltage at the gates of each of the isolation switches 56 goes to zero forcing the positive terminals of each of the cells 22 to be disconnected from the scaling resistor 66.

The supply voltage $V_s$ may be provided by way of a conventional alternating current (AC) adapter 67, such as a Model No. SA35-3123, as manufactured by Astec, with a direct current (DC) output, such as 16 VDC. The AC adapter 67 provides a charging current $I_{charge}$ to charge the series connected cells 22. In order to protect the battery charging circuit, a current limiting resistor 60 and an input diode 61 are provided. The current limiting resistor 60 limits the charging current to the cells 22 as well as the battery charging circuitry. The input protection diode 61 prevents the isolation switches 56 from being turned on by the battery cells 22.

The supply voltage $V_s$ input to the battery charging circuit is under the control of the switching circuit 58 which may include a FET 69, a bipolar junction transistor (BJT) 71 and four resistors 73, 75, 77 and 79. The FET 69 is used to connect and disconnect the output of the AC adapter 67 to the battery charging circuitry. The FET 69 is under the control of the BJT 71, which, in turn, is under the control of a CONTROL INPUT. The CONTROL INPUT may be an output from a microprocessor or any chip that can provide a logical high and low output. When the CONTROL INPUT is high, the gate of the FET 69 is pulled low to disconnect the AC adapter 67 from the battery charging circuit. Alternatively, when the CONTROL INPUT is low, the gate of the FET 69 will be high to connect the AC adapter 67 to the battery charging circuitry.

As mentioned above, the reference voltage $V_{REF}$ is developed by the circuit identified within the dash box 56 which includes a differential amplifier 70, a plurality of serially connected resistors 72, 74 and 76, and a Zener diode 78. The resistors 72, 74 and 76 form a voltage divider to divide the voltage from the power supply voltage $V_s$ to develop a cell voltage $V_{cell}$ that is applied to the positive terminal of the differential amplifier 70. The Zener diode 78 regulates the voltage applied to the positive input of the differential amplifier 70. The output of the differential amplifier 70 is connected to its negative input to form a unity gain buffer to provide an output voltage $V_{REF}$, virtually identical to the regulated voltage applied to the positive terminal of the differential amplifier 70. This output voltage $V_{REF}$, in turn, is applied to the negative inputs of each of the difference amplifiers 54 by way of scaling resistors 80. These scaling resistors 80, in conjunction with resistors 82, connected between the negative junction of the difference amplifiers 54 and ground, enable the reference voltage $V_{REF}$ to be scaled to a predetermined value at the negative input of each of the difference amplifiers 54. Similarly, the actual cell voltages ($V_1$, $V_2$ or $V_3$), applied to the positive inputs of each of the difference amplifiers 54, may likewise be scaled by way of the respective scaling resistors 66 and 84, connected between the positive input of the difference amplifiers 54 and ground. Preferably, the values of the scaling resistor pairs 66 and 82, as well as 80 and 84, should be equal.

In accordance with an important aspect of the invention, the circuitry illustrated in FIG. 7 can be formed as a printed circuit board (PCB) and incorporated within a multiple cell battery housing. In particular, various embodiments of the battery are contemplated. In one embodiment, the PCB incorporating the battery charging circuit illustrated in FIG. 7 may be formed as the bottom end cap 34 illustrated in FIG. 3. In yet an alternate embodiment of the invention, the circuitry disclosed in FIG. 7 could be incorporated into a flexible PCB and used to form the outer housing around the battery. In both embodiments, external auxiliary contacts 38 would not be required since the required connections between the positive and negative terminals of each of the respective cells 22 could be made within the battery housing. As such, in such embodiments, the battery would be formed with only two external terminals 26 and 28 to enable the battery to be connected in a circuit or, alternatively, to external source charging voltage or current.

Figure 8:
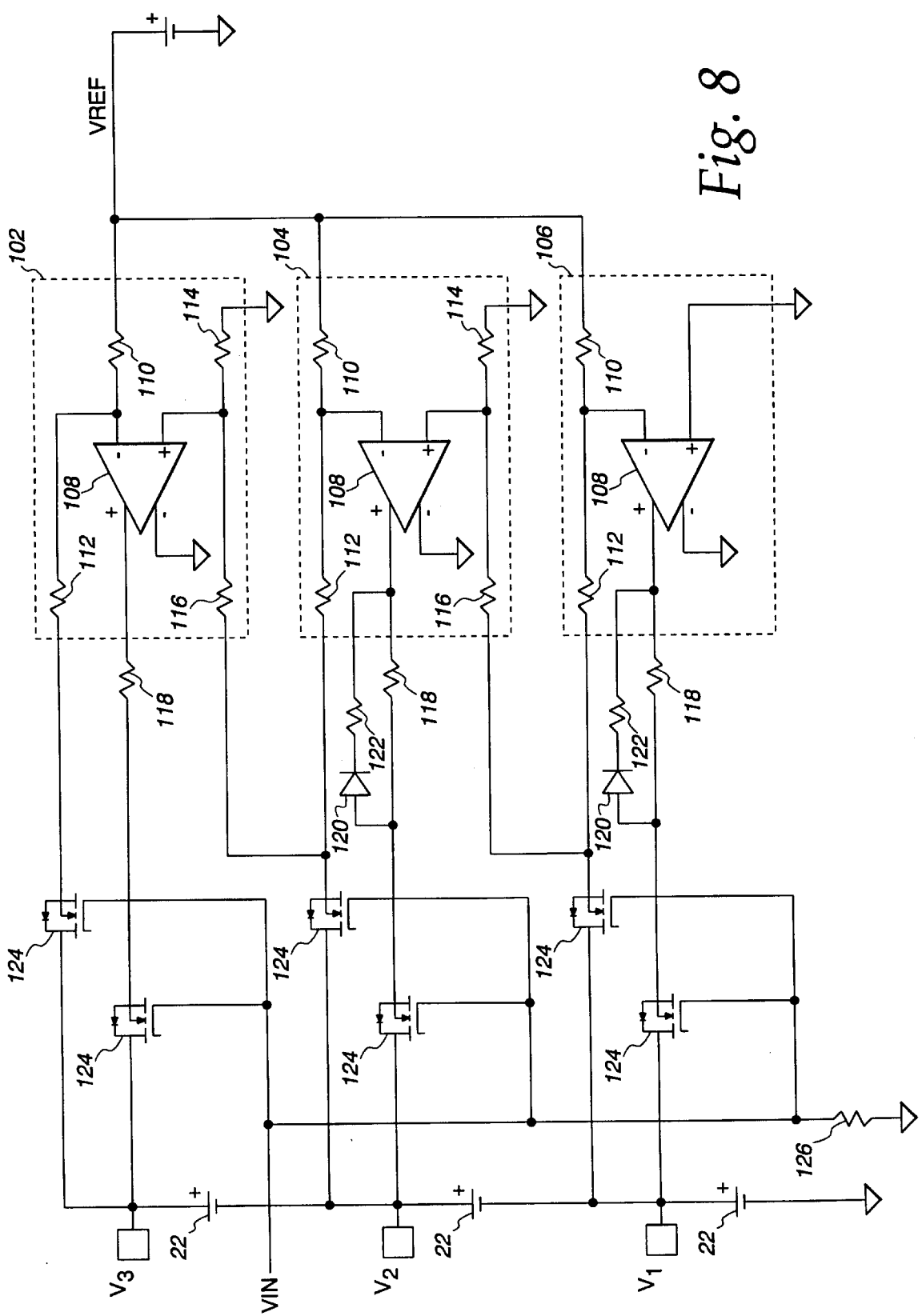
FIG. 8 is a detailed schematic diagram of an alternative embodiment of the battery charging circuit in accordance with the present invention.

An alternative embodiment of the battery charging circuit is illustrated in FIG. 8. In this embodiment, a voltage source 102, 104 or 106 is connected across each of the serially connected battery cells 22. Each of the voltage sources 102, 104 and 106 is adapted to source current to its associated battery cell 22 during a charging condition. In addition, two of the voltage sources 104 and 106 are also adapted to sink current to prevent overcharging of certain of the battery cells 22. In particular, the voltage source 102 is a floating voltage source and sources charging current anytime the battery cell 22 connected between nodes $V_2$ and $V_3$ is less than a desired voltage. Since the voltage source 102 is connected to the first battery cell 22 in the serially connected chain, it is not necessary for the voltage source 102 to sink current during any of the conditions. However, the voltage sources 104 and 106 must be able to source current for charging and additionally sink current to prevent overcharging of various of the downstream battery cells 22.

Each of the voltage sources 102, 104 and 106 is configured as a differential amplifier which includes an operational amplifier 108 and 2 to 4 input scaling resistors 110, 112, 114 and 116. In particular, as shown, the voltage source 102 is connected across the battery cell 22 disposed the nodes $V_2$ and $V_3$. More specifically, the negative terminal of the differential amplifier 108 is connected to the positive terminal of the battery cell 22 and referenced to a reference voltage $V_{REF}$ by way of the resistors 110 and 112. The positive terminal of the differential amplifier 108 is connected to the negative terminal of the battery cell 22 connected between the nodes $V_2$ and $V_3$, and referenced to ground by way of the input scaling resistors 114 and 116. With such a configuration, the voltage source 102 will float and charge the battery cell 22 (connected between the nodes $V_2$ and $V_3$) any time the voltage across that cell 22 falls below the reference voltage $V_{REF}$. More particularly, the voltage applied to the positive terminal of the differential amplifier 108 is connected to the negative terminal of the battery cell 22 which coincides with the node $V_2$. The voltage at the node $V_2$ is equal to the sum of the cell voltages connected between the node $V_2$ and ground. During ideal conditions (i.e., cells fully charged), the voltage at the node $V_2$ will be twice the reference voltage $V_{REF}$. The voltage applied to the negative terminal of the differential amplifier 108 is the positive terminal of the battery cell 22 connected between the nodes $V_2$ and $V_3$, referenced to a reference voltage $V_{REF}$. During ideal conditions, the node voltage $V_3$ will be three times the reference voltage $V_{REF}$. However, since the voltage applied to the negative terminal of the differential amplifier 108 is referenced to the reference voltage $V_{REF}$, the voltage applied to the negative terminal of the differential amplifier 108 will only be twice $V_{REF}$ during ideal conditions. By sizing the resistors 110, 112, 114 and 116 to have the same value, the differential amplifier 108 will track the voltage across the battery cell 22 connected between the nodes $V_2$ and $V_3$ such that any time the voltage of that cell 22 falls below $V_{REF}$, the output voltage of the differential amplifier 108 will go positive and provide a charging current to the cell 22 connected between the nodes $V_2$ and $V_3$. In order to limit the charging current applied to the battery cells 22, a current limiting resistor 118 is connected between the output of the differential amplifier 108 and the positive cell terminal.

An important aspect of the circuitry illustrated in FIG. 8 is that once the downstream cells 22 (i.e., connected between the node $V_2$ and ground) become fully charged before the cell connected between the nodes $V_2$ and $V_3$ becomes fully charged, the voltage sources 104 and 106 act to sink the charging current sourced by the voltage source 102 which normally would flow through all three of the serially connected battery cells in order to prevent overcharging of any fully charged cells connected downstream. Since the voltage source 102 is connected to the first cell in the series connected string, the voltage source 102 does not sink current during any condition.

The differential amplifier 108 that forms a portion of the voltage source 104 is connected across the battery cell 22, connected between the nodes $V_1$ and $V_2$. The negative terminal of the differential amplifier 108 of the voltage source 104 is connected to the plus positive terminal of the battery cell 22 connected between the nodes $V_1$ and $V_2$ referenced to the reference voltage $V_{REF}$. The positive terminal of the differential amplifier 108 is connected to the negative terminal of the battery cell 22 connected between the nodes $V_1$ and $V_2$, referenced to ground. Thus, the voltage applied to the negative terminal of the differential amplifier 108 is equal to the node voltage $V_2$. This node voltage $V_2$ is equal to the algebraic sum of the two serially connected battery cells 22 connected between the node $V_2$ and ground. Since the voltage applied to the negative terminal of the differential amplifier 108 is referenced to $V_{REF}$, the voltage applied at the input of the negative terminal will be $V_2$ minus $V_{REF}$. By sizing the input scaling resistors 110 and 112 to be equal, this voltage will be ½ $V_2$ minus $V_{RER}$. During ideal conditions when $V_2$ is equal to twice $V_{REF}$, the voltage applied to the negative terminal of the differential amplifier 108 will be $V_{REF}$. The voltage applied to the positive terminal of the differential amplifier 108 will be $V_1$. By proper sizing of the input scaling resistors 114 and 116, the voltage applied to the positive terminal of the differential amplifier 108 will be ½ $V_1$, since the positive terminal is referenced to ground. Thus, the voltage source 104 will monitor the voltage across the cell connected between the nodes $V_1$ and $V_2$ and provide a positive output voltage anytime that cell voltage falls below $V_{REF}$. When the voltage across that cell 22 falls below $V_{REF}$, the differential amplifier 108 will output a positive voltage in order to provide a charging current which will nominally flow through the two serially connected battery cells 22 connected between the node $V_2$ and ground.

As mentioned above, each of the voltage sources 104 and 106 is able to sink current as well as source current. Thus, should the battery cell 22 connected between the nodes $V_1$ and $V_2$ become fully charged prior to the cell connected between the nodes $V_2$ and $V_3$, the voltage source 104 will sink the charging current flowing through the battery cell 22 connected between the nodes $V_2$ and $V_3$ through to ground by way of the output of its differential amplifier 108 since the voltage at the positive terminal of the battery cell connected to the node $V_2$ will be relatively more positive relative to the output of the differential amplifier 108. By sinking the charging current during such a condition, the battery cell connected between the nodes $V_1$ and $V_2$ will not become overcharged.

In order to limit power dissipation, an additional network may be provided for the voltage source 104, as well as the voltage source 106, which provides a different resistance for the voltage source 104 in a current sinking mode as opposed to a current sourcing mode. In particular, a diode 120 and serially connected resistor 122 may be connected in parallel with each of the current limiting resistors 118 for the voltage sources 104 and 106. By connecting the polarity of the diode 120 as shown, the effective resistance for the voltage sources 104 and 106 will be equivalent to the value of the current limiting resistance 118 in a current sourcing mode. However, in a current sinking mode, the diodes 120 will be biased such that the resistance in a current sinking mode is equivalent to the resistance of the parallel combination of the resistances 122 and 118.

The voltage source 106 is similar to the voltage sources 102 and 104 except the positive terminal of its differential amplifier 108 is referenced to ground. As such, there is no need for the input scaling resistors 114 and 116 on the voltage source 106. The negative terminal of the differential amplifier 108 is connected to the positive terminal of the battery cell 22 connected between the node $V_1$ and ground. The negative terminal is referenced to the reference voltage $V_{REF}$. Thus, by sizing the input scaling resistors 110 and 112 to have the same value, the input to the negative terminal of the differential amplifier 108 will be equivalent to ½ the difference of $V_1$ minus $V_{REF}$. Thus, during ideal conditions (i.e., $V_1 = V_{REF}$), ground potential will be applied to the negative terminal of the differential amplifier 108. However, when the cell voltage falls below $V_{REF}$, the differential amplifier 108 of the voltage source 106 will provide a positive output which will provide a charging current to charge the battery cell 22 connected between the node $V_1$ and ground. Should the battery cell 22 connected between $V_1$ and ground become fully charged prior to any of the remaining cells, the voltage source 106 will sink current to ground by way of the output of the differential amplifier 108 in a manner as discussed above.

As mentioned above, the input scaling resistors 110, 112, 114 and 116 are selected to be equal in value, whenever the reference voltage $V_{REF}$ is selected to be equivalent to the desired cell voltage when the cell is fully charged. However, principles of the present invention are applicable to any reference voltage. However, should alternative reference voltages be selected, the values of the scaling resistors 110, 112, 114 and 116 would have to be adjusted accordingly.

In order to prevent the circuitry illustrated in FIG. 8 from discharging the battery cells 22 when no battery supply voltage $V_{in}$ is available, a plurality of isolation switches 124 are provided to disconnect the battery cells from the circuitry during such a condition. Each of the isolation switches 124 is configured as a field effect transistor (FET) having source, drain and gate terminals. The gate terminals of each of the FETs 124 are connected together and connected to the charging supply voltage $V_{in}$. Thus, when charging supply voltage $V_{in}$ is available, the FETs 124 will all be on to connect the battery cells 22 to the circuitry illustrated in FIG. 8. If the supply voltage $V_{in}$ is removed, the FETs 124 will turn off in order to disconnect the battery cells 22 from the circuitry illustrated in FIG. 8. A resistor 126 is connected between the gates of each of the FETs 124 and ground. This resistor 126 is used to discharge any gate capacitance in the FETs 124.

Obviously, many modifications and variations of the present invention are possible in light of the above teachings. Thus, it is to be understood that within the scope of the appended claims, the invention may be practiced otherwise than as specifically designate above.

What is desired to be claimed by a Letters Patent is:

1. A battery charging system for charging a plurality of serially connected battery cells comprising:

means for providing charging current to said plurality of serially connected cells;

means for sensing the voltage across each of said serially connected cells;

means responsive to said sensing means for shunting the charging current around individual cells whose voltage is above a predetermined value; and means for disconnecting said plurality of serially connected cells from said battery charging system to prevent substantially any discharge of said plurality of serially connected cells when said providing means is disconnected from said plurality of serially connected cells, said disconnecting means including one or more voltage activated electronic switches.

2. A battery charging system as recited in claim 1, wherein said sensing means includes differential amplifiers for comparing the voltage of each of the cells with a predetermined reference voltage.

3. A method for charging a plurality of serially connected battery cells comprising the steps of:

(a) providing a charging current to said cells;

(b) sensing the voltage across each of said cells;

(c) shunting the charging current around each cell whose voltage is greater than a predetermined value; and (d) disconnecting said plurality of serially connected cells from said charging current using one or more voltage activated electronic switches to prevent substantially any discharge of said plurality of serially connected cells when said charring current is disconnected from said plurality of serially connected cells.

4. A battery charging system for a plurality of serially connected battery cells comprising:

means for sourcing charging current to each of said serially connected cells;

means for sensing the voltage across each of said serially connected cells;

means responsive to said sensing means for sinking current to ground around any cell whose voltage is above a predetermined value; and means for disconnecting said plurality of serially connected cells from said battery charging system to prevent substantially any discharge of said plurality of serially connected cells when said providing means is disconnected from said plurality of serially connected cells, said disconnecting means including one or more voltage activated electronic switches.

5. A battery charging system as recited in claim 4, wherein said sensing means includes a plurality of differential amplifiers, each connected across the positive and negative terminals of each of the cells.

6. A battery charging system as recited in claim 4, wherein said electronic switches include a field effect transistor (FET).

* * * * *

UNITED STATES PATENT AND TRADEMARK OFFICE
CERTIFICATE OF CORRECTION

PATENT NO.   : 5,821,733
DATED        : October 13, 1998
INVENTOR(S)  : Turnbull, et al.

It is certified that error appears in the above-indentified patent and that said Letters Patent is hereby corrected as shown below:

Column 10, line 20, change "charring" to --charging--.

Signed and Sealed this

Second Day of March, 1999

Attest:

Q. TODD DICKINSON

Attesting Officer

Acting Commissioner of Patents and Trademarks